A. S. DENNIS.
TYPE WRITING MACHINE.
APPLICATION FILED JULY 22, 1913.
1,180,250.
Patented Apr. 18, 1916.
3 SHEETS—SHEET 2.
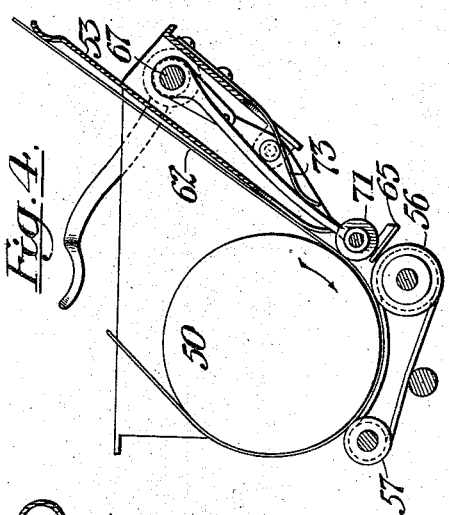
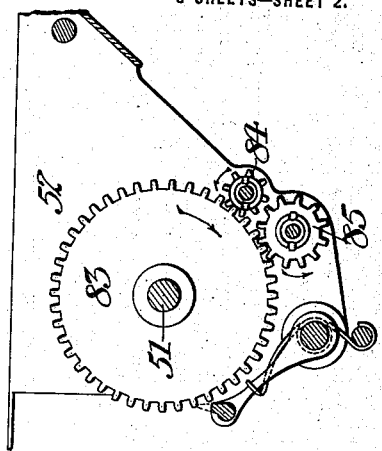
Witnesses:
Titus H. Trove
F. E. Alexander
Inventor
Adolphus S. Dennis
by B. B. Stickney
his Attorney

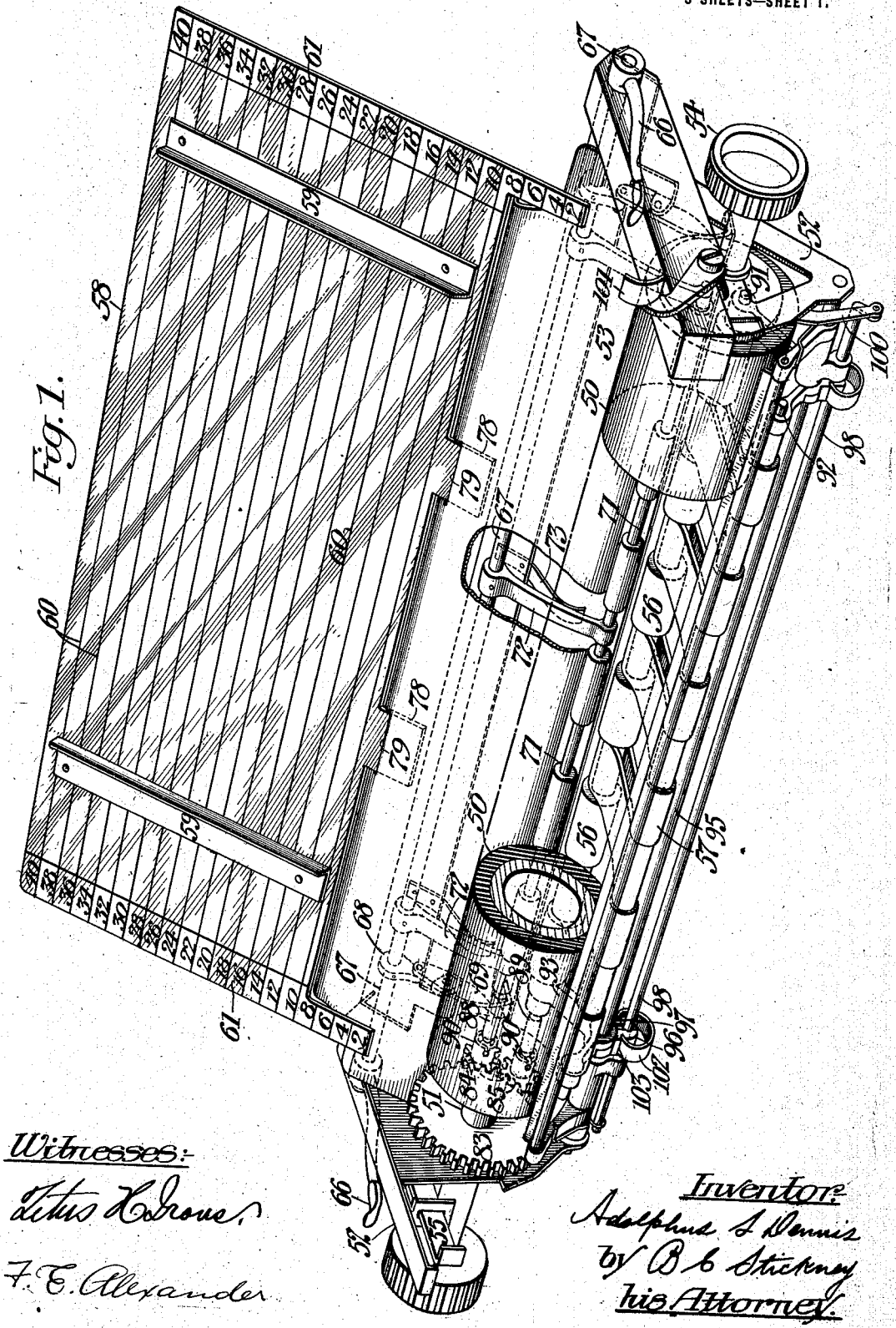

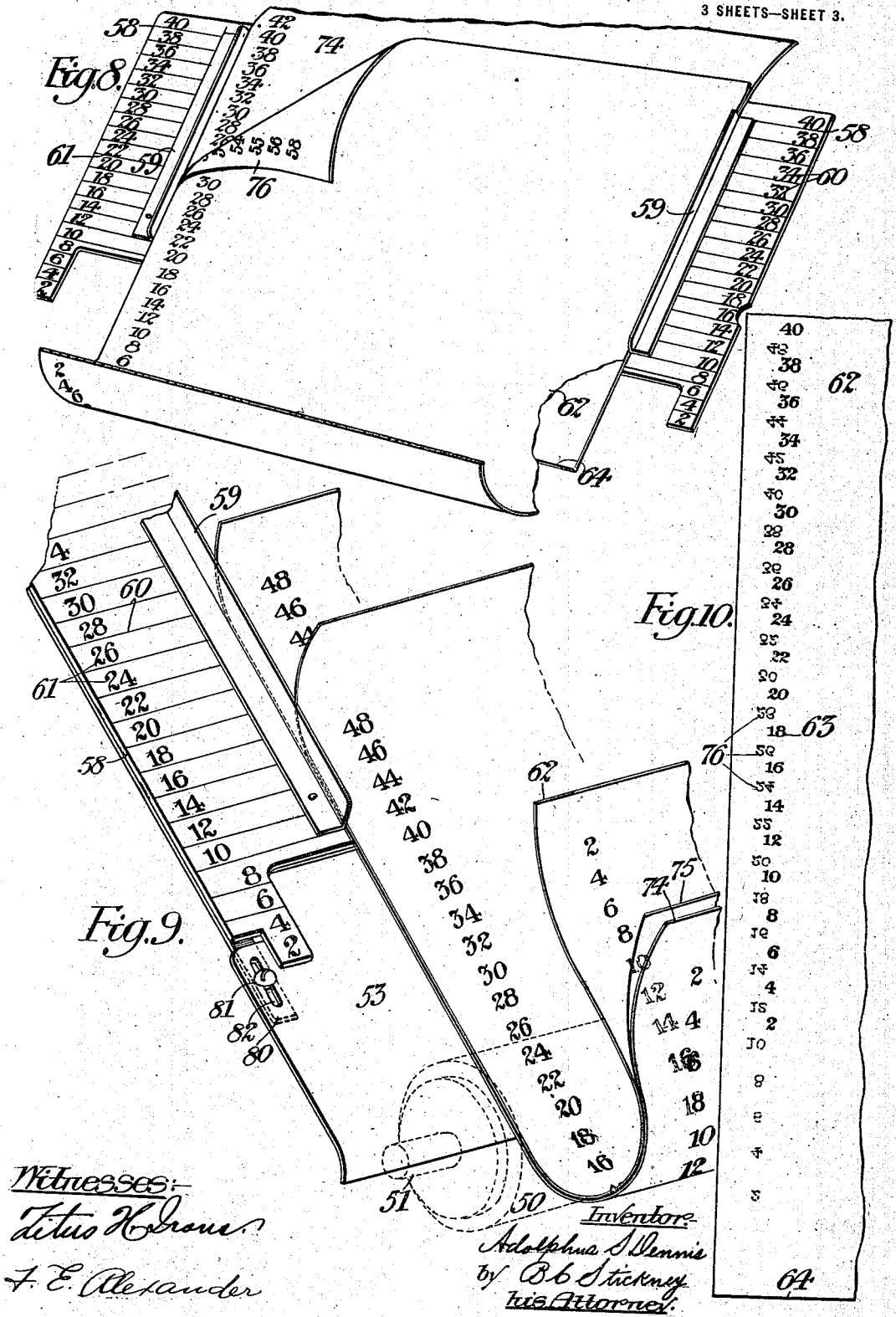

UNITED STATES PATENT OFFICE.

ADOLPHUS S. DENNIS, OF LAKEWOOD, OHIO, ASSIGNOR TO UNDERWOOD TYPEWRITER COMPANY, OF NEW YORK, N. Y., A CORPORATION OF DELAWARE.

TYPE-WRITING MACHINE.

1,180,250.

Specification of Letters Patent.

Patented Apr. 18, 1916.

Application filed July 22, 1913. Serial No. 780,443.

*To all whom it may concern:*

Be it known that I, ADOLPHUS S. DENNIS, a citizen of the United States, residing in Lakewood, in the county of Cuyahoga and State of Ohio, have invented certain new and useful Improvements in Type-Writing Machines, of which the following is a specification.

This invention relates to means for superposing and feeding the work-sheets in typewriting machines.

One of the main objects of the invention is to provide improved means for conveniently and accurately placing one sheet over another or others in any desired relationship; the invention being particularly useful in cases where the leading edges of the superposed work-sheets occupy different positions during the writing operation, instead of coinciding in the usual manner.

This invention makes provision for placing sheets in the machine so that the first line of writing will fall in different positions on different sheets. In order to attain this result, a special work-sheet supporting-board or table is arranged at the introductory side of the typewriter platen, and it is provided with a scale of numbers which agrees with a similar scale or column of numbers on the margin of the rear side of the work-sheet; the relation being such that when the work-sheet is inserted with its leading edge against a gage, the numbers on the back of the work-sheet will register with the numbers on the sheet-board. Thus it will be seen that the sheet-board is as serviceable for the purposes of this invention, as if it were itself a work-sheet permanently and properly fixed in the machine.

The invention is shown in connection with a revoluble platen in an Underwood frontstrike writing machine, and as usual, the work-sheet, when introduced into the machine, is upside-down, and its rear side faces the operator. Therefore, the numbers on the work-sheet read from the bottom to the top of the rear side of the sheet.

The principal object of the numbering on the sheet and on the board is to enable the operator to place several sheets in the machine, one of them substantially in advance of another, and all the sheets accurately positioned with reference to one another, so that the first line of writing will fall at different desired points on the different sheets. The operator first inserts a sheet with its leading edge against a gage. He then withdraws the gage and advances the sheet around the platen by means of the feeding rolls, until a point is reached at which a second sheet should be introduced.

It will be borne in mind that when a second sheet is introduced, its scale of numbers will register with those on the feed board; and if the operator should desire the first line of writing on the first inserted sheet to fall ten line-spaces below the first line of writing on the second inserted sheet, he will, before inserting said second sheet, advance the first sheet ten line-spaces, which he can readily do by reference to the scale on the sheet board, and he may also advance both the first and second sheet any number of spaces before inserting a third sheet, and so on, the interleaving carbon sheets being inserted as necessary.

For convenience, the faces or fronts of the work-sheets are provided with numbered lines which agree with the line-spacing movements of the platen, so that the first line of writing will be numbered for convenience "2", the second line "4", the third line "6", and so on; and the spacing or interval between the successive lines on the face of the work-sheet are equal to those on the rear of the work-sheet; but the numbers in the margin on the face of the work-sheet read from top to bottom in the natural manner.

From the foregoing, it will be understood that if the operator desires, for instance, the first typewriting to fall on line "18" of the first inserted sheet, and to fall on line "8" of the second inserted sheet, he will proceed by placing the first sheet in the machine and gaging it, and then advancing it by means of the feed rolls ten points, that is, until the number "18" on the rear of the first sheet registers with the number "8" on the feed board, which, it will be remembered, is equivalent to a work sheet permanently fixed in the machine.

When the operator places the second sheet in the machine, its line "8" will register with line "8" of the machine board, and hence with line "18" on the first inserted sheet. The operator then inserts a carbon between the sheets, and turns the platen until line "8" on the front of the second inserted sheet reaches the printing position. The operator then writes on line "8", and the carbon copy thereof appears on line "18" of the first inserted sheet, which may answer to the record sheet, in such work as condensed billing, etc.

The improvements further relate to the feed roll mechanism. Preferably in addition to the usual bottom feed rolls of the Underwood machine, there is provided a special roll at the introductory side of the platen; and below this special roll is the gage for the leading edge of the sheet. The special roll may be released independently of the main or bottom rolls, and simultaneously the sheet gage may be thrown against the platen. Upon releasing the gage, the special roll is thrown against the platen and feeds a sheet to the bite of the platen and the usual main or bottom feed rolls.

The special feed roll referred to is suitably connected by gearing to the platen so as to positively drive the paper forwardly; and the same is true of the bottom rolls; the bottom forward roll being connected to the bottom rear roll by a conveyer belt, whereby the accuracy of alinement of sheets secured by the use of said leading edge gage is preserved as the sheets feed forwardly around the platen.

Another feature of the invention resides in the improved spring construction for pressing the bottom feed rolls against the platen. These feed rolls are carried upon arms which radiate from a common shaft or support; and these arms have extensions which are engageable by a rock shaft having cams to force the extensions upwardly, and thereby drop the arms and rolls away from the platen. These extensions are, according to the present invention, connected by means of a C spring which encircles said releasing shaft and seats in notches in said extensions. The pressure of the spring in each case is divided evenly between the roll arms. This gives a simple and inexpensive construction in which the tension of each spring is properly distributed between the forward and rear rolls.

Other features and advantages will hereinafter appear.

In the accompanying drawings, Figure 1 is a perspective front view of the platen frame of an Underwood front-strike writing machine provided with my improvements; some parts being broken away to disclose others. Figs. 2 to 6 are sectional side elevations to illustrate successive steps in operating the machine. Fig. 2 shows normal position. This figure illustrates how a sheet may be introduced as in ordinary correspondence, by adjusting it to the bite of the platen and the special feed roll. This adjustment may be preparatory to subsequently gaging the sheet as in Fig. 3 in which the special feed roll is shown released, and the leading edge of the sheet is shown resting upon the gage. Fig. 4 shows the same sheet advanced preparatory to the insertion of a second sheet. Fig. 5 shows a second sheet inserted and gaged; a carbon being placed between the two sheets. Fig. 6 shows all three sheets advanced from the Fig. 5 position to position for writing the first line; it being noted that the leading edge of the first inserted sheet, which is next to the platen, is far in advance of the leading edge of the second inserted sheet, which lies outside of the first. Fig. 7 is a sectional side elevation to illustrate the gear driving connection between the platen and the system of feed rolls. Fig. 8 is a diagrammatic perspective to illustrate the use of numbers in superposing the sheets. Fig. 9 shows the superposed sheets brought to position for writing the first line. Figs. 8 and 9 correspond with Figs. 5 and 6. Fig. 10 is a fragment of the margin of a work sheet, showing the numbers running from bottom to top on the rear side thereof; the corresponding numbers on the front of the sheet showing in dotted lines.

The Underwood front strike typewriting machine is usually provided with a revoluble platen 50 having an axle 51 whereby it is journaled in the ends 52 of a platen frame, said ends connected by a paper shelf 53 in rear of the platen. The platen is revolved by means of hand wheels 54 or the usual line-spacing mechanism 55. Rear rolls 56 and front rolls 57 usually run upon the bottom of the platen to feed the work sheets around the same.

I provide a special sheet-supporting board 58 which extends upwardly and rearwardly from the top of the paper shelf 53, and which may have opposite side gages 59 between which the work sheets fit. The face of this sheet board may be divided by horizontal lines 60 into spaces, and the spaces may be numbered as at 61, at the side margin of the board, the numbers reading from the bottom to the top of the column. Each of the intervals between the lines 60 is equal to two line-space intervals, and for convenience the spaces are numbered only with even numbers, "2", "4", "6", "8", etc.

As seen at Fig. 10, the rear side of the work-sheet 62 has a corresponding column of numbers 63, reading from bottom to top, and agreeing with those at 61 on the sheet board. The intervals between the numbers on the sheet agree with those on the sheet board, each interval equaling two of the minimum line-space intervals of the platen.

It will be seen that the numbers in the column 63 on the work sheet read from the leading edge 64 to the bottom edge of the sheet, the numbers being placed upside-down on the sheet, so that when the sheet is dropped in the machine with the leading edge of the sheet foremost, these numbers will appear in their natural positions to the operator, although if the sheet were held right-side up, the numbers would appear upside-down.

The first number "2" in the column 63 on the rear of the work sheet is at such an interval from the leading edge 64 thereof, that when said edge rests on a gage 65 (Fig. 3) at the introductory side of the platen, the numbers in the column 63 on the sheet register with the numbers in the column 61 on the sheet board, as in the case of the under sheet at Fig. 8. The sheet board with its numbers, therefore, is as useful as if it were itself a work-sheet properly placed in the machine whereby the operator is provided with a handy guide for use in adjusting the various sheets, there being in fact one sheet always in correct position, so that if he adjusts any sheet in a certain relation to the permanent sheet board, the adjusted sheet will necessarily have the same relation to the next inserted work-sheet.

The gage 65 is normally thrown back from the platen as at Fig. 2, but by depressing either of two handles 66 at the ends of the carriage, the rock shaft 67 is rocked, and arms 68 thereon vibrate levers 69 (pivoted at 70), which carry said gage 65 against the platen, as at Fig. 3. The leading edge 64 of the sheet 62 now rests on said gage, as at Fig. 3, with its numbers 63 registering with the numbers 61 on the sheet board.

Inasmuch as it is desired to effect a relative adjustment between this sheet and the next sheet which is to be inserted, the method followed is to adjust the first inserted sheet, so that when the second sheet is inserted with its edge resting on the gage 65, it will have the desired relationship to the first sheet. In other words, the first sheet is advanced around the platen as far as desired, before inserting the second sheet; the first sheet being arrested at such a point that when the second sheet is inserted and gaged by the leading edge gage 65, the two sheets will have the desired relative adjustment, and may then be advanced together without disturbing their relative adjustment until the proper position is reached for receiving the first line of writing.

In order to effect the preliminary advance of the first sheet, the gage 65 is retired, by releasing or raising the handle 66, and simultaneously a feed roll 71 above said gage is brought to bear upon the sheet near its leading edge to advance the same to the bite of the platen and the main feed roll 56 (Fig. 4). It will be seen that the roll 71 is mounted upon arms 72 pending from said rock shaft 67, and normally pressed against the platen by springs 73. The rotation of the platen carries the sheet forward as far as necessary for adjusting it with reference to the second sheet which is now to be inserted. For example, it is desired to advance the first sheet 62 ten line-spaces relatively to the second sheet, and hence the platen is turned until the numbers on the sheet at 63 are advanced ten points beyond the numbers on the sheet board, which, it will be remembered, will coincide with the numbers on the second sheet when the latter is subsequently inserted. In other words the first sheet is adjusted relatively to the second sheet, although the latter has not yet been placed in the machine, the sheet board itself being a substitute therefor, for this purpose. The first sheet having been advanced ten points, the second sheet 74 is now inserted with its leading edge against the gage 65 as at Fig. 5, and the two sheets now have the correct relative positions. The operator then inserts a carbon 75 between the sheets, and retracts the gage 65, throwing in the roll 71, and turns the platen to feed all the sheets around until they are all brought to position for the first line to be written thereon, as at Fig. 6.

It will be observed that on the front of the sheets is a marginal column of numbers 76 which read in the natural order from top to bottom of the sheet, and are placed at two line-space intervals to agree with the numbers in column 63 on the back of the sheet. These numbers 76 on the front of the sheet are used for numbering the typewritten lines thereon. If the operator desires to have the first line of writing appear on line "18" on the front of the sheet, he rotates the platen to advance both sheets until line "18" registers with the usual front platen scale which is seen diagrammatically at 77. The first line of writing will hence fall on line "18" on the first inserted sheet and on line "8" on the second inserted sheet. In practice, the operator, by inserting the first sheet, will decide on what line he will begin his writing thereon, for instance on line "18", and will then adjust said sheet, as at Fig. 4, until line "18" in column 63 registers with line "8" in column 61 on the sheet board, since the first line of writing is to be on lines "18" and "8" of the respective sheets. Hence the method of adjusting the sheets is very simple and easily understood.

It will also be understood that additional sheets may be inserted, for instance, if it is desired that the first line of writing should fall on line "6" of the third sheet, the first two sheets, 62 and 74, will be advanced from the Fig. 5 position until the number "8" on the second inserted sheet registers with "6" on the sheet board; and then the third sheet will be inserted and a second carbon added. Then all three sheets will be advanced until the line "6" on the face of the third sheet registers with the front platen scale 77. Then the writing will proceed, the impressions falling on line "6" of the outside sheet, line "8" of the second sheet, and line "18" of the inside sheet.

It will be understood that the third sheet could, if desired, be placed between the sheets 62 and 74, or between 62 and the platen. Thus the improvement is capable of a wide variety of uses for different bookkeeping and other purposes.

The sheet-supporting board 58 may have at its lower edge tongues 78 to insert detachably in slots 79 formed in the paper shelf 53, whereby the bottom edge of the sheet board may rest upon the top of the paper shelf and be steadied by the tongues as at Fig. 1.

At each lower corner, a tongue 80 may project down from the sheet board beneath the paper shelf, and be secured by a screw 81 passing through a slot 82 in the sheet board.

The sheet board itself is preferably made of transparent celluloid, so that the light may strike through the sheets thereon, which in some cases gives an advantage in securing accurate registry of the sheets with one another, and with the lines on the board, particularly if the sheets are themselves transparent.

In order to preserve the relationship of the sheets in accuracy, the feeds rolls 71 and 56 are connected to the platen by gearing, so as to be driven positively thereby; the platen having a large gear 83 meshing with a pinion 84 for the roll 71, and a pinion 85 for the main roll 56, and the front roll 57 is also power driven, being connected by elastic bands 86 to the rear rolls 56; the bands running upon suitable pulleys 87 on the roll shafts, and the upper reach of each band running upon the platen to help feed the paper as illustrated. The pinions 84, 85 are connected to their respective roll shafts by flexible connections comprising floating shafts 88, 89, having universal joints 90, thus permitting the rolls to be released from the platen as required.

The main rolls 56, 57 are carried upon shafts 91, 92, the shafts mounted in arms 93, 94 which radiate from a tie rod or shaft 95 which connects the ends of the platen frame. The arms 93, 94 are provided with extensions 96, 97 which extend downwardly from the fixed shaft 95, and are operated upon by a release shaft 98 in the usual manner, said shaft having opposite cams 99 to engage the extensions 96, 97 and being connected at its end by a link 100 to a release key 101.

The improved spring construction for these main pressure rolls is seen in the form of a C-shaped spring 102, which incloses the ends of the extensions 96, 97, and therefore surrounds the rock shaft 98, the ends of the springs being seated in recesses 103, 104, in the extensions. This makes a compact and effective arrangement of spring, and moreover the pressure of the spring is divided between the front and rear rolls, so that one spring or one set of springs may answer for both rolls.

Variations may be resorted to within the scope of the invention, and portions of the improvements may be used without others.

Having thus described my invention, I claim:

1. In a typewriting machine, the combination with a line-spacing rotatable platen, of a work-sheet collating board adapted to support substantially the whole of a full-sized work-sheet, and mounted at the introductory side of the platen, said collating board provided with a line-spacing scale, a paper-table forming an extension of said collating board and adapted to guide the work-sheet to the platen, means for supporting said work-sheet on said collating board in predetermined position with relation to another work-sheet on said board which has previously been adjusted thereon, and means whereby both work-sheets may be fed together in adjusted relation around said platen.

2. In a typewriting machine, the combination with a line-spacing rotatable platen, of a work-sheet collating board adapted to support substantially the whole of a full-sized work-sheet, and mounted at the introductory side of the platen, said collating board provided with an ascending line-space scale to correspond with a similar scale on the rear side of a work-sheet, a paper-table forming an extension of said collating board and adapted to guide the work-sheet to the platen, means for supporting said work-sheet on said collating board in predetermined position with relation to another work-sheet on said board which has previously been adjusted thereon, means whereby both work-sheets may be fed together in adjusted relation around said platen; the relationship of the scale on the work-sheet and the scale on the collating board being such that the numbers on the back of the work-sheet will register with the scale numbers on said board, and a line-spacing mechanism for rotating said platen and said feeding means, so that the line-spaces thereby obtained will agree with the numbering on said scales.

3. In a typewriting machine, the combination with a revoluble platen, of a work-sheet supporting-board mounted at the introductory side of the platen and provided with a scale of line-spacing numbers to agree with a similar scale on the rear side of a work-sheet, and a gage for the leading edge of the sheet, the relation being such that when a work-sheet is inserted with its leading edge against said gage, the numbers on the back thereof will register with the numbers on the sheet board.

4. In a typewriting machine, the combination with a revoluble platen, of a work-sheet supporting board mounted at the introductory side of the platen and provided with a scale of line-spacing numbers to agree with a similar scale on the rear side of a work-sheet, and a gage for the leading edge of the sheet, the relation being such that when a work-sheet is inserted with its leading edge against said gage, the numbers on the back thereof will register with the numbers on the sheet board, the numbers on the board and sheet being arranged to read from the bottom to the top, and spaced at intervals equal each to the distance the work-sheet is advanced by a line-spacing movement or movements of the platen.

5. In a typewriting machine, the combination with a line-spacing platen, of a gage at the introductory side of the machine for the leading edge of the work sheet, and a work-sheet supporting-board behind said gage and provided with a scale of line-spacing numbers to agree with a similar scale on the work-sheet, the relation being such that when the work-sheet is inserted with its leading edge against the gage, the numbers on the sheet will register with the numbers on the sheet board.

6. In a typewriting machine, the combination with a line-spacing platen, of a gage at the introductory side of the machine for the leading edge of the work-sheet, a work-sheet supporting-board behind said gage and provided with a scale of line-spacing numbers to agree with a similar scale on the work-sheet, the relation being such that when the work-sheet is inserted with its leading edge against the gage, the numbers on the sheet will register with the numbers on the sheet board; feed rolls arranged to run upon said platen, and means for advancing the sheet past the gage to the bite of the feed-rolls and platen.

7. In a typewriting machine, the combination with a line-spacing platen, of a gage at the introductory side of the machine for the leading edge of the work-sheet, a work-sheet supporting-board behind said gage and provided with a scale of line-spacing numbers to agree with a similar scale on the work-sheet, the relation being such that when the work-sheet is inserted with its leading edge against the gage, the numbers on the sheet will register with the numbers on the sheet board; feed rolls arranged to run upon the bottom of the platen, and a feed roll arranged to run upon the platen above said gage; both the gage and the last-mentioned feed roll being releasable from the platen.

8. The combination with a revoluble platen; of a sheet-collating mechanism therefor including a sheet-board at the introductory side of the platen for the arrangement of work-sheets thereon, a gage for the leading edge of a work-sheet when placed on said sheet-board, said sheet-board having a line-spacing scale thereon to agree with a scale on the rear side of the work-sheet when the latter is placed on the sheet-board with its leading edge resting on the gage, a feed-roll back of said gate to engage the sheet and coöperate with the platen to advance the leading edge of the sheet beyond the gage, said gage movable away from the platen to permit said advance of the sheet and returnable to operative position for gaging the edge of a second sheet placed on said sheet-board in rear of the first-mentioned sheet after the latter has been advanced a predetermined distance indicated by said scale, means to release said feed-roll to permit said placing of the second sheet on the sheet-board, and additional feed-rolls to run on the platen in advance of the gage and operative to hold the first sheet in said advanced position while the second sheet is being placed on the sheet-board and secured in its position of adjustment relative to the first sheet by said first-mentioned feed-roll.

9. The combination with a revoluble platen; of a sheet-collating mechanism therefor including a sheet-board at the introductory side of the platen for the arrangement of work-sheets thereon, a gage for the leading edge of a work-sheet when placed on said sheet-board, said sheet-board having a line-spacing scale thereon to agree with a scale on the rear side of the work-sheet when the latter is placed on the sheet-board with its leading edge resting on the gage, a feed-roll back of said gage to engage the sheet and coöperate with the platen to advance the leading edge of the sheet beyond the gage, said gage movable away from the platen to permit said advance of the sheet and returnable to operative position for gaging the edge of a second sheet placed on said sheet-board in rear of the first-mentioned sheet after the latter has been advanced a predetermined distance indicated by said scale, means to release said feed-roll to permit said placing of the second sheet on the sheet-board, and additional feed-rolls to run on the platen in advance of the gage and operative to hold the first sheet in said advanced position while the second sheet is being placed on the sheet-board, said first-mentioned roll being connected by gearing to the platen to positively drive the work-sheets at the surface speed of the platen.

10. The combination with a revoluble platen; of a sheet-collating mechanism therefor including a sheet-board at the introductory side of the platen for the arrangement of work sheets thereon, a gage for the leading edge of a work-sheet when placed on said sheet-board, said sheet-board having a line-spacing scale thereon to agree with a scale on the rear side of the work-sheet when the latter is placed on the sheet-board with its leading edge resting on the gage, a feed-roll back of said gage to engage the sheet and coöperate with the platen to advance the leading edge of the sheet beyond the gage, said gage movable away from the platen to permit said advance of the sheet and returnable to operative position for gaging the edge of a second sheet placed on said sheet-board in rear of the first-mentioned sheet after the latter has been advanced a predetermined distance indicated by said scale, means to release said feed-roll to permit said placing of the second sheet on the sheet-board, additional feed-rolls to run on the platen in advance of the gage and operative to hold the first sheet in said advanced position while the second sheet is being placed on the sheet-board, gearing connecting said first-mentioned roll to the platen to positively drive the work-sheets at the surface speed of the platen, and means connecting said additional rolls to the platen to cause them to be driven thereby and to operate in unison at the surface speed of the platen and thus retain the work-sheets in their relative position of adjustment as they are advanced over the platen.

11. In a typewriting machine, the combination with a line-spacing platen, of a gage at the introductory side of the machine for the leading edge of the work-sheet, and a work-sheet supporting-board behind said gage and provided with a scale of line-spacing numbers to agree with a similar scale on the work-sheet, the relation being such that when the work-sheet is inserted with its leading edge against the gage, the numbers on the sheet will register with the numbers on the sheet-board; said sheet-board having opposite side gages for the sheets.

12. In a typewriting machine, the combination with a platen, of a work-sheet collating board adapted to support substantially the whole of a full-sized work-sheet, and mounted at the introductory side of the platen, a paper-table forming an extension of said collating board and adapted to guide said work-sheet to the platen, means for effecting line-space movements of the platen, said collating board having horizontal lines dividing it into spaces to correspond with the line-spacing movements of the platen, and also having numbers associated with said lines and forming an ascending scale, said numbers adapted to register with the numbers of a similar ascending scale on the back of the work-sheet, means for supporting said work-sheet on said collating board in predetermined position with relation to another work-sheet on said board which has previously been adjusted thereon, and means whereby both work-sheets may be fed together in adjusted relation around said platen.

13. In a typewriting machine, the combination with a revoluble platen, of a work-sheet supporting-board mounted at the introductory side of the platen and provided with a scale of line-spacing numbers to agree with a similar scale on the rear side of a work-sheet; and a gage for the leading edge of the sheet, the relation being such that when a work-sheet is inserted with its leading edge against said gage, the numbers on the back thereof will register with the numbers on the sheet-board; said sheet-board divided by horizontal lines into spaces to correspond with the line-spacing movements of the platen.

14. In a typewriting machine, the combination with a revoluble platen, of a work-sheet supporting-board mounted at the introductory side of the platen and provided with a scale of line-spacing numbers to agree with a similar scale on the rear side of a work-sheet, and a gage for the leading edge of the sheet; the relation being such that when a work-sheet is inserted with its leading edge against said gage, the numbers on the back thereof will register with the numbers on the sheet-board; said sheet-board being transparent.

15. In a typewriting machine, the combination with a revoluble platen, of a work-sheet supporting-board mounted at the introductory side of the platen and provided with a scale of line-spacing numbers to agree with a similar scale on the rear side of a work-sheet, and a gage for the leading edge of the sheet, the relation being such that when a work-sheet is inserted with its leading edge against said gage, the numbers on the back thereof will register with the numbers on the sheet board, the numbers on the board and sheet reading from the bottom to the top, and agreeing with the line-spacing movements of the platen; said sheet-supporting board detachably connected to the paper-shelf of the typewriter.

16. In a typewriting machine, the combination with a revoluble platen, and a paper shelf, of a work-sheet supporting-board mounted at the introductory side of the platen and provided with a scale of line spacing numbers to agree with a similar scale on the rear side of a work-sheet, and a gage for the leading edge of the sheet, the relation being such that when a work-sheet is inserted with its leading edge against said gage, the numbers on the back thereof will register with the numbers on the sheet-board; said sheet-supporting board having tongues, and said paper-shelf having slots in which the tongues are inserted.

17. In a typewriting machine, the combination with a revoluble platen, and a paper shelf, of a work-sheet supporting-board mounted at the introductory side of the platen and provided with a scale of line-spacing numbers to agree with a similar scale on the rear side of a work-sheet, a gage for the leading edge of the sheet, the relation being such that when a work-sheet is inserted with its leading edge against said gage, the numbers on the back thereof will register with the numbers on the sheet-board; said sheet-supporting board having tongues, and said paper-shelf having slots in which the tongues are inserted, and means for fastening the sheet-board to the paper-shelf at different adjustments.

18. In a typewriting machine, the combination with a revoluble platen, and a paper shelf, of a work-sheet supporting-board mounted at the introductory side of the platen and provided with a scale of line-spacing numbers to agree with a similar scale on the rear side of a work-sheet, and a gage for the leading edge of the sheet, the relation being such that when a work-sheet is inserted with its leading edge against said gage, the numbers on the back thereof will register with the numbers on the sheet-board; said sheet-supporting board having tongues, and said paper-shelf having slots in which the tongues are inserted, means for fastening the sheet-board to the paper-shelf at different adjustments, and means for affording relative adjustment of the sheet-board and gage to bring one nearer to the other.

19. In a typewriting machine, the combination of a rotary platen, means to feed a work-sheet thereover, means to gage the leading edge of a second work-sheet and engage it with the platen after the first work-sheet has been fed forward, and an indicating device to indicate the extent the first sheet has been fed in advance of the second sheet.

20. In a typewriting machine, the combination of a platen, means to gage a series of work-sheets placed successively on the platen in superposed relation and at different positions of advancement in line-feeding direction, and indicating means to indicate the difference in the advancement of the several sheets.

21. In a typewriting machine, the combination with a rotary platen, of means to feed a work-sheet thereover, a gage for gaging a second work-sheet placed on the platen after the first work-sheet has been advanced a predetermined distance, an indicating means to indicate said distance.

22. In a typewriting machine, the combination with a rotary platen, of means for gaging work-sheets placed successively on the platen at different distances of advancement, and indicating means comprising a series of indicating numbers spaced and arranged to indicate line-space distances on the work-sheet, said means arranged to indicate the extent each work-sheet has been advanced over the platen when a succeeding work-sheet is introduced.

23. In a typewriting machine, the combination with a platen and line-spacing means therefor, of a work-sheet collating board adapted to support substantially the whole of a full-sized work-sheet at the introductory side of the platen, and extending laterally beyond the sheet-supporting surface thereof, the laterally extending portions of said board provided with a scale of line-spacing numbers extending in ascending order away from the platen and to correspond with a similar scale on the rear side of the work-sheet, so that when the work-sheet is placed on the collating board, said scales are exposed to view, with the numbers thereof arranged along the side of the work-sheet in register with the numbers on the back of the work-sheet, means for supporting said work-sheet on said collating board in predetermined position with relation to a second work-sheet on said board which has previously been adjusted with reference to said scale, separate independently operable means for clamping said first and second work-sheets in adjusted position against said platen, so as to enable both sheets to be fed together in adjusted position around said platen when the latter is line-spaced, and a paper shelf forming an extension of said board adapted to guide the work-sheets to the platen.

ADOLPHUS S. DENNIS.

Witnesses:
F. E. ALEXANDER,
GEO. W. NAYLOR.